Figure 1:
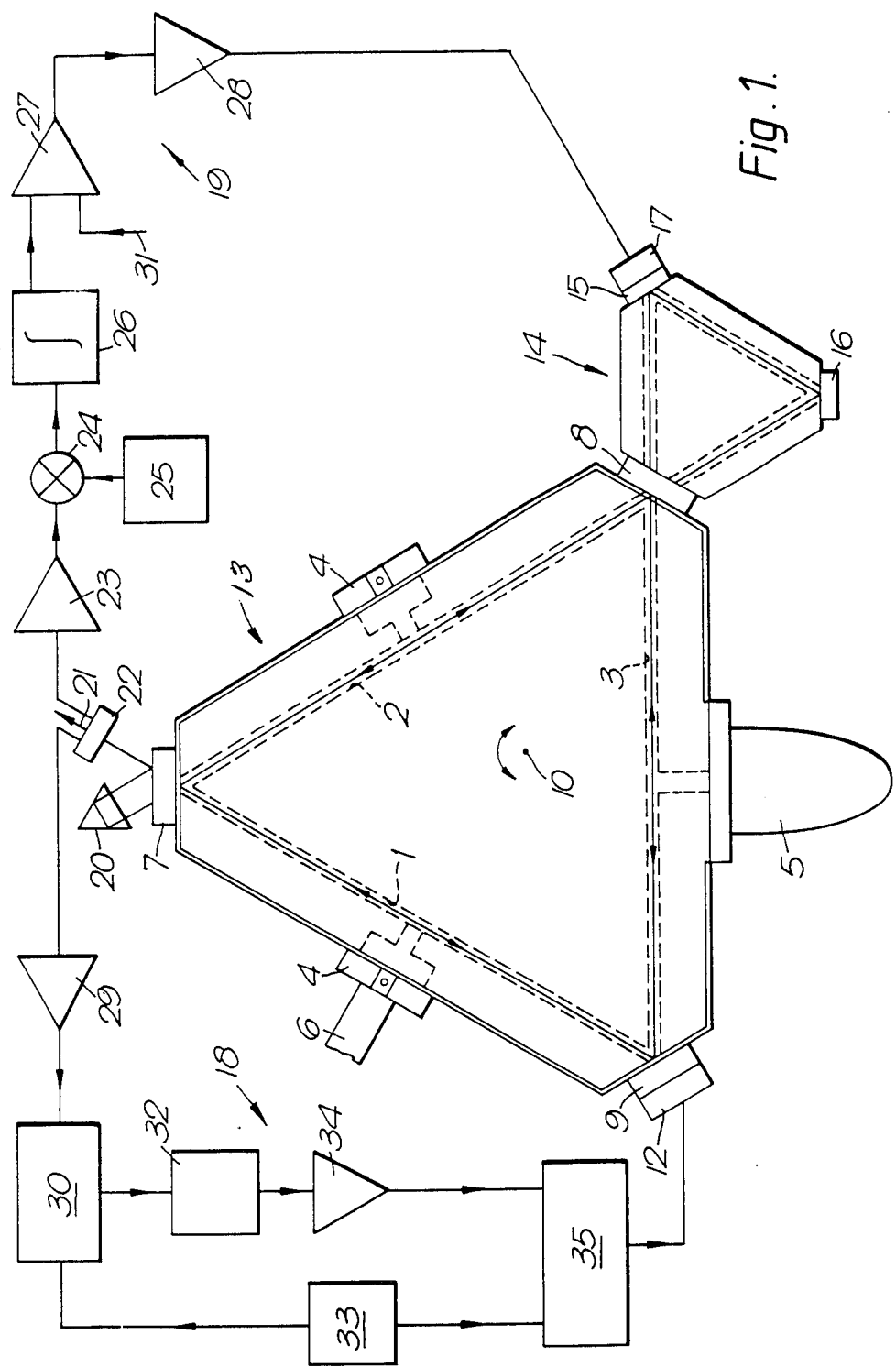

United States Patent [19]

Malvern

[11] Patent Number: 4,632,555
[45] Date of Patent: Dec. 30, 1986

[54] RING LASER GYROSCOPES

[75] Inventor: Alan R. Malvern, Berkshire, England

[73] Assignee: British Aerospace PLC, London, England

[21] Appl. No.: 526,280

[22] Filed: Aug. 25, 1983

[30] Foreign Application Priority Data

Aug. 26, 1982 [GB] United Kingdom ............... 8224582

[51] Int. Cl.[4] .......................................... G01C 19/64
[52] U.S. Cl. ....................................... 356/350; 372/94
[58] Field of Search ...................... 356/350; 372/94, 6

[56] References Cited

U.S. PATENT DOCUMENTS

| | | | |
|---|---|---|---|
| 3,411,849 | 11/1968 | Aronowitz | 356/350 X |
| 3,503,005 | 3/1970 | Mocker | 356/350 X |
| 3,537,027 | 10/1970 | Smith | 372/94 X |
| 3,575,667 | 4/1971 | Smith | 356/350 X |
| 3,644,841 | 2/1972 | Smith | 372/94 X |
| 4,013,365 | 3/1977 | Vali et al. | 372/6 X |
| 4,267,478 | 5/1981 | Ljung et al. | 356/350 |
| 4,271,397 | 6/1981 | Stiles et al. | 356/350 X |
| 4,473,297 | 9/1984 | Simpson et al. | 356/350 |
| 4,556,319 | 12/1985 | Gauert et al. | 356/350 |

*Primary Examiner*—Davis L. Willis
*Assistant Examiner*—S. A. Turner
*Attorney, Agent, or Firm*—Cushman, Darby & Cushman

[57] ABSTRACT

A ring laser gyroscope has a primary ring 13 including a gas discharge tube 4 enclosing an active lasing medium. The gyroscope has additionally a secondary, passive ring 14 optically coupled to the primary ring 13 by a partially transmissive mirror 8. A mirror 15 of the secondary ring 14 is adjustable, under the control of a feedback loop 19, to vary the optical path length of the secondary ring 14 so that the latter resonates at one of the longitudinal modes of the primary ring 13, thereby enhancing this mode and concentrating the output power of the gyroscope in one frequency, while suppressing other longitudinal modes of the primary ring.

10 Claims, 5 Drawing Figures

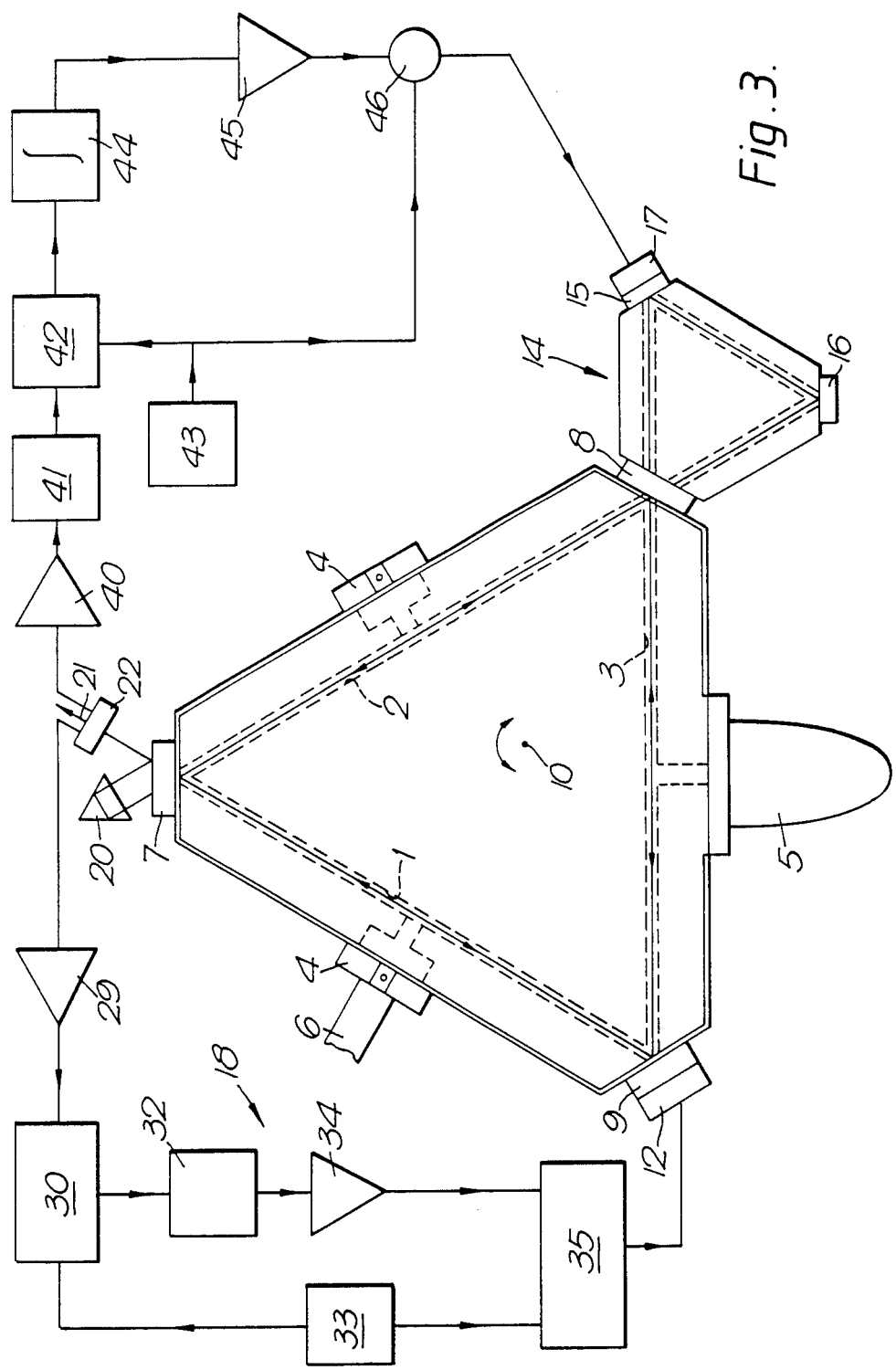

RING LASER GYROSCOPES

This invention relates to ring laser gyroscopes.

As is well known, a ring laser gyroscope employs two beams of light which are propagated in opposite directions around the ring or so-called cavity. The cavity is typically of triangular or rectangular form and may be of a modular construction or an integral construction. In a modular ring laser gyroscope one limb, or part thereof, is formed by a laser tube which produces the contra-propagating beams of light which are transmitted to the remainder of the ring through Brewster angle windows. In an integral cavity, the limbs of the ring communicate directly with each other and the ring is partly filled with a lasing medium which produces the desired contra-propagating beams of light.

In an ideal ring laser gyroscope, the frequency difference between the beams of light is zero when the ring is stationary but moves from zero when the ring is rotated about a sensitive axis which is an axis extending at right angles to the plane of the ring. Thus the frequency difference between the two contra-propagating beams of light is proportional to the angular rotation rate of the ring about the sensitive axis. In a ring laser gyroscope the magnitude and sense of this frequency difference are detected in order to determine the magnitude and sense of the rotation of the gyroscope about the sensitive axis.

The two propagating light beams resonate within the laser cavity at a number of frequencies separated by c/L where c is the velocity of light and L is the length of the laser cavity. If L is large the frequency separation is small and there will, therefore, be more resonant frequencies within the gain bandwidth of the laser medium. Hence if a longer laser cavity is used to obtain greater output angular sensitivity from the ring laser gyroscope, it is desirable to suppress all but one longitudinal resonance (or so-called longitudinal mode) so that the output power of the gyroscope is concentrated in one frequency.

In this context, a larger laser cavity means a perimeter greater than approximately two meters, which corresponds to a longitudinal mode spacing of about 150 MHz. It is believed that the main problem in employing a large ring laser gyroscope is the low frequency separation of the longitudinal modes so that it is difficult to run the laser in a single longitudinal mode with the usual 50:50 $Ne^{20}:Ne^{22}$ (plus helium) isotope ratio in the $\lambda 632.8$ nanometers laser transition. This is because the gain width (at room temperature) of the transition is about 2 GHz (at the 1/e points where e is the base of natural logarithms) so that unless the laser is run at a very low gain/loss ratio more than one longitudinal mode will oscillate. It is known that at very low gain/loss ratios the effect of backscattered light is more important and the lock-in rate threshold of the gyroscope (i.e. the rotation rate below which the two contra-rotating beams lock together in frequency thereby giving no output signal for a given rotation rate) is increased.

The present invention provides a ring laser gyroscope comprising a primary active ring around which two contra-rotating beams of light are, in use, propagated, a secondary passive ring optically connected to the primary ring, the optical path length of the primary ring being different from that of the secondary ring, and path length control means associated with the secondary ring and operable to adjust the optical path length of the secondary ring so that the latter resonates at the frequency of one of the longitudinal modes of the primary ring, whereby the light returning to the primary ring, from the secondary ring for that mode is enhanced, whereas light in other longitudinal modes is suppressed.

Normally, the optical path length of the secondary ring will be smaller than the optical path length of the primary ring. As a result, the longitudinal modes or resonant frequencies of the secondary ring have larger frequency separations than the longitudinal modes or resonancies of the primary ring. By arranging for there to be only one resonant frequency of the secondary ring within the gain bandwidth of the active medium within the primary ring, one of the longitudinal modes of the primary ring is enhanced whilst other longitudinal modes of the primary ring are suppressed since these other longitudinal modes occur at frequencies for which the secondary ring cannot resonate. It will be appreciated that both rings must resonate simultaneously for laser operation.

Preferably, the path length control means comprise a mirror which is movable to alter the optical path length of the secondary ring. The path length control means may additionally comprise a piezo-electric transducer which is operative to move the mirror. The piezo-electric transducer may be servo-controlled so as to minimise a heterodyne signal derived from the primary ring. Alternatively, the piezo-electric transducer may be servo-controlled so as to maximise the output laser power of the primary ring.

In the preferred embodiment to be described, the primary ring is of triangular shape and the secondary ring is also of triangular shape, but smaller in size than the primary ring in the ratio of the order of one to ten. However, it will be appreciated that the primary ring and/or the secondary ring could be of any other convenient shape, e.g. rectangular or square.

Figure 2A:
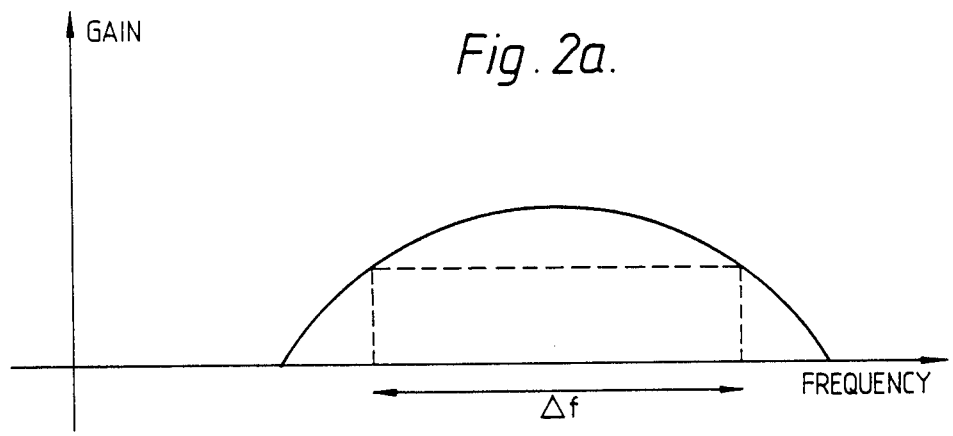
Figure 2B:
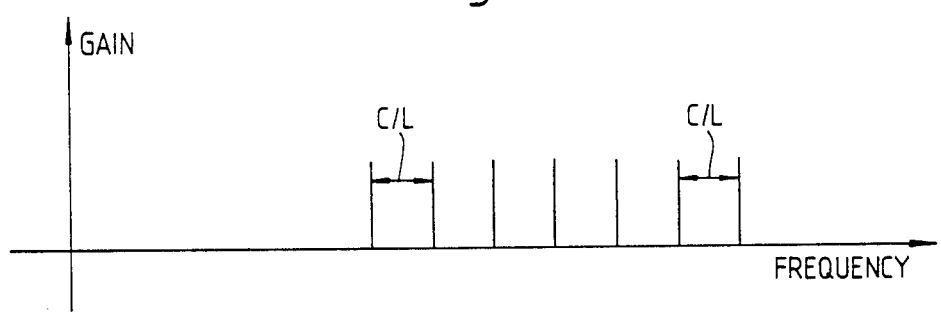
Figure 2C:
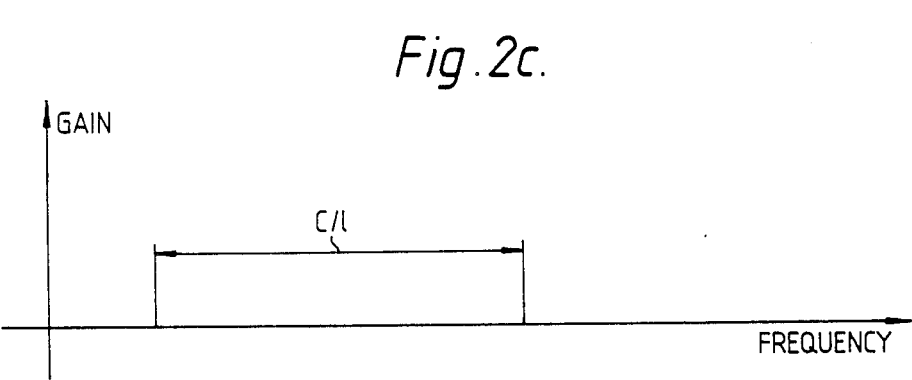

Two ring laser gyroscopes according to the invention will now be described in greater detail, and by way of example, with reference to the accompanying drawings, in which:

FIG. 1 is a schematic plan view of one ring laser gyroscope showing diagrammatically the associated electrical circuitry, FIG. 2 consisting of FIGS. 2a, 2b and 2c, shows three graphs for explaining the operation of the ring laser gyroscope of FIG. 1, and FIG. 3 is a schematic plan view of a second ring laser gyroscope showing diagrammatically the associated electrical circuitry.

Referring to FIG. 1, the ring laser gyroscope is of integral construction and comprises a block of a material which is non-metallic and has a low coefficient of expansion. A preferred material for the block is that known under the trade name ZERODUR. The block is formed with three bores which define a triangular shaped cavity having three limbs 1, 2 and 3. The limbs 1 to 3 are provided, respectively, at suitable points along their lengths with two anodes 4 and a cathode 5, one anode being provided with a fill tube 6.

Three mirrors 7, 8 and 9 are arranged at the respective intersections of the limbs 1, 2 and 3. The mirror 7 is partially transmissive to transmit therethrough a proportion of each of the two contra-rotating beams of light, whereby to provide an output signal from which the magnitude and direction of the rotation of the laser gyroscope about the sensitive axis 10 can be determined. The mirror 9 is associated with a piezo-electric transducer 12 for adjusting the position of the mirror 9 in order to adjust the path length of the beams within the block. This path length is defined by the three limbs 1 to 3 and forms a primary cavity or ring 13. The mirror 8 is also partially transmissive in order to couple the contra-rotating beams of light in the primary ring 13 into a secondary cavity or ring 14. The secondary ring 14 is also triangular and of integral construction but has a path length approximately 1/10th the path length of the primary ring 13. The secondary ring 14 is defined by the mirror 8 and two further mirrors 15 and 16, the mirror 15 being associated with a piezo-electric transducer 17 for moving the mirror 15 in order to adjust the optical path length of the secondary ring 14.

The transducer 12 is servo-controlled by a feedback loop 18 in order to alter the optical path length of the primary ring 13. Also, the transducer 17 is servo-controlled by a further feedback loop 19 to alter the optical path of the secondary ring 14. Each of the feedback loops 18, 19 derives its driving signal from the two contra-rotating beams transmitted through the mirror 7. These beams are fed into a combining prism 20 which delivers the beams to a photodiode 22. The photodiode 22 is sensitive to the interference fringe pattern between the two contra-rotating beams fed to the combining prism 20, the output of the photodiode 22 being an electrical signal on lead 21 which is fed to signal processing means (not shown) for providing the output signal of the laser gyroscope in a conventional manner.

A second output of the photodiode 22 is fed to a high frequency preamplifier 23 (to detect the beats at frequency c/L) the output of which is in turn fed to a mixer 24 to which is also supplied the output signal from a local oscillator 25. The two input signals fed to the mixer 24 are heterodyned therein, the output of the mixer 24 being a signal representative of the frequency difference between the input signals. The heterodyned output of the mixer 24 is integrated in an integrator 26 the output of which is fed to a comparator 27 which compares the output of the integrator 26 with a reference signal supplied on lead 31. The output of the comparator 27 is fed to a high voltage amplifier 28 which drives the piezo-electric transducer 17 coupled to the mirror 15.

The feedback loop 18 for the mirror 9 comprises a low frequency preamplifier 29 supplied with a third output from the photodiode 22. The output of the low frequency preamplifier 29 is fed to a phase sensitive detector 30 the output signal of which is fed to an integrator 32. A local oscillator 33 having a frequency of the order of 1 KHz is connected to the detector 30. The output of the integrator 32 is fed to a high voltage amplifier 34 which in turn is fed to a summing junction 35 to which the output of the local oscillator 33 is also fed. The output of the summing junction 35 drives the piezoelectric transducer 12 for moving the mirror 9.

FIG. 2a shows the variation of gain of the primary ring 13 with frequency. The gain bandwidth of the active medium within the chamber 4 is indicated by $\Delta f$ and is set by the loss of the cavity and the gain of the lasing medium. FIG. 2b shows the longitudinal modes, i.e. the different frequencies at which the primary ring 13 resonates. These longitudinal modes have a frequency separation of c/L where c is the velocity of light and L is the length of the primary ring 13. FIG. 2c shows the longitudinal modes for the secondary ring 14, the modes being separated by c/l where l is the length of the secondary ring 14. It can be seen that within the gain bandwidth of the primary ring 13 there is only one longitudinal mode or resonant frequency of the secondary ring 14. The path length of the secondary ring 14 is adjusted by means of the feedback loop 19 so that the optical path length of the secondary ring 14 is an integral number of wavelengths of one of the longitudinal modes within the gain bandwidth of the active medium within the chamber 4. As a result, the light returning to the primary ring 13 from the secondary ring 14 for that mode is enhanced, whereas light in other longitudinal modes is suppressed. This concentrates the output power of the gyroscope in one frequency, thereby giving the desired result.

If the sensitivity of the laser rings 13 and 14 to rotation about the axis 10 is considered, then it appears that the two rings 13 and 14 are giving outputs in the opposite sense. However, the smaller or secondary ring 14 does not contain any active gain medium, whereby it is a passive ring and will, therefore, have an insignificantly small sensitivity to rotation. Thus, the rotation sensing properties are determined by the larger or primary ring 13 that contains the gain medium in the chamber 4. The smaller ring 14 will introduce negligible backscattered light into the larger ring 13, as the intensity of the backscattered light returning into the larger active ring 13 will be reduced by two transits through the mirror 8. The smaller ring 14 does not show any lock-in rate threshold as there is no gain medium within this ring, hence the lock-in rate threshold is also determined by the larger ring 13. It is known that the lock-in rate threshold varies roughly as $p^{-2}$, where p is the perimeter of the ring so that, for instance, a x10 increase in perimeter gives rise to a reduction of x100 in the lock-in rate threshold. Thus it should be easily possible with existing mirror technology to achieve a lock-in threshold below the horizontal component of the earth's rate, which is about 12°/Hr. at 50° latitude.

To give an example of the dimensions to be considered, for the larger ring 13 with a perimeter of 2 m, mode spacing 150 MHz, a smaller ring 14 of perimeter 0.1 m (mode spacing 3 GHz) may be used to select a single mode for the He-Ne $\lambda$ 632.8 mm/lasing transition. The combined assembly would need to be mechanically or otherwise "dithered" to ensure a linearity of output against rotation rate. The mechanical dither could be of a low frequency because of the high inertia of the large ring 13 and of sufficient amplitude to eliminate the effects of the lock-in threshold.

FIG. 3 illustrates an alternative ring laser gyroscope which is basically similar to that of FIG. 1 but in which a non-heterodyne detection technique is employed. The basic ring laser is the same as that of FIG. 1 and similar components have like reference numerals. A combiner prism 20 and an output photodiode 22 are employed as before and the feedback loop 18 is identical. The drive to the piezo-electric transducer of the mirror 15 of the secondary ring is, however, different.

The second output of the photodiode 22 is fed to a preamplifier 40, the output of which is fed to a bandpass filter 41. A phase sensitive detector 42 receives as inputs the output of the filter 41 and the output of a local oscillator 43 operating at about 100 Hz. The output of the phase sensitive detector 42 is integrated by an integrator 44 and the output of the latter is amplified by a high voltage amplifier 45 and then applied to a summing junction 46, together with the output from the local oscillator 43. The output from the summing junction 46 is then used to drive the piezo-electric transducer 17 of the mirror 15.

In the embodiment of FIG. 3, the servo time constant of the secondary ring 14 is very much larger (for example ten times) than that of the primary ring 13. In this non-heterodyne detection technique, the mirror 15 is moved at the frequency set by the local oscillator 43 to maximise the power output of the primary ring 13.

The primary ring in either of the two illustrated embodiments, instead of being formed in a ceramic block, may be formed by a fibre optic ring. The fibre optic ring would be optically coupled not only to a gain medium within a discharge tube but also to a secondary ring the path length of which would be adjusted as previously described in relation to FIG. 1 in order to effect the required enhancement of the selected longitudinal mode.

It will be seen that in both of the described embodiments the secondary ring 14 is used to enhance one longitudinal mode of the primary ring, thereby concentrating the output power of the gyroscope in one frequency.

I claim:

1. A ring laser gyroscope comprising:
    a primary, active ring resonator;
    a secondary, passive ring resonator having a path length substantially less than that of the primary ring and external to the primary ring but optically coupled to the primary ring for enhancing a desired single longitudinal resonance mode of the primary ring;
    path length varying means connected to the secondary ring for adjusting the path length around the secondary ring;
    photo-sensitive means connected to said primary ring for forming an output signal indicative of the laser radiation propagating around the primary ring, the photo-sensitive means being responsive for said output signal to include an inter-mode heterodyne component corresponding to the beat between said desired longitudinal resonance mode and any adjacent, undesired longitudinal resonance mode which may appear within the primary ring; and
    path length control means connected between the photosensitive means and the path length varying means and operable for sensing the presence of said inter-mode heterodyne component within the output signal from the photo-sensitive means and for forming a path length varying means control signal which is dependent upon said component and which causes the path length of the secondary ring to be varied to suppress said component and hence also said undesired longitudinal resonance mode.

2. A ring laser gyroscope according to claim 1, wherein the optical path length of the secondary ring is smaller than the optical path length of the primary ring in the ratio of substantially one to ten.

3. A ring laser gyroscope according to claim 1, wherein the primary ring has an optional path length in excess of two meters.

4. A ring laser gyroscope according to claim 1, wherein the path length varying means comprises a mirror which is movable to alter the optical path length of the secondary ring.

5. A ring laser gyroscope according to claim 4, wherein the path length control means additionally comprise a piezo-electric transducer which is operative to move the mirror.

6. A ring laser gyroscope according to claim 1, wherein the primary ring is a fibre optic ring.

7. A ring laser gyroscope according to claim 1, wherein said path length control means comprises frequency sensitive amplifier means connected to receive the output signal formed by the photo-sensitive means and operable for passing said inter-mode hererodyne components, mixing means connected to the amplifier and operable for combining the output of the amplifier with a local oscillator signal, integrating means connected to the mixing means for integrating the output thereof, and comparator means connected to the integrating means and operable for forming a difference signal representative of the difference between the output from the integrating means and a fixed reference signal.

8. A ring laser gyroscope comprising:
    a primary, active ring resonator;
    a secondary, passive ring resonator having a path length substantially less than that of the primary ring and external to the primary ring but optically coupled to the primary ring for enhancing a desired single longitudinal resonance mode of the primary ring;
    path length varying means connected to the secondary ring for adjusting the path length around the secondary ring;
    photo-sensitive means connected to said primary ring for forming an output signal indicative of the laser radiation propagating around the primary ring, and
    path length control means connected between the photo-sensitive means and the path length varying means, the path length control means including band-pass filter means connected to receive the output signal formed by the photo-sensitive means;
    a low frequency oscillator;
    phase-sensitive detector means having respective inputs connected to the output of the band-pass filter means and the output of the oscillator means;
    integrating means having an input connected to the output of the phase-sensitive detection means;
    summing means having respective inputs connected to the output of the oscillator means and the output of the integrating means, the summing means having an output connected to a control input of the path length varying means and being operable to form at its output a path length varying means control signal which comprises the sum of the output signals from the integrating means and the oscillator means.

9. A ring laser gyroscope comprising:
    a primary active resonator;
    a secondary passive ring resonator having a path length substantially less than that of the primary ring and external to the primary ring but optically coupled to the primary ring for enhancing a desired single longitudinal resonance mode of the primary ring;
    photo-sensitive means connected to the primary ring for forming an output signal representative of the laser radiation propagating around the primary ring;
    first and second oscillators for supplying respective low frequency oscillatory signals having respective different frequencies;
    a first phase-sensitive detector connected to said photo-sensitive means and said first oscillator for forming an output signal indicative of a component of the output of the photo-sensitive means at the frequency of the first oscillator;

first integrator means connected to the output of the first phase-sensitive detector for integrating the output signal therefrom;

first summing means connected to the output of the first integrator means and to said first oscillator for forming a first path length control signal;

first path length adjusting means coupled to the primary ring for adjusting the path length around the primary ring and connected to said first summing means for being controlled by said first path length control signal;

a second phase-sensitive detector connected to said photo-sensitive means and said second oscillator for forming an output signal indicative of a component of the output of the photo-sensitive means at the frequency of the second oscillator;

a second integrator means connected to the output of the second phase-sensitive detector for integrating the output signal therefrom;

second summing means connected to the output of the second integrating means and to said second oscillator for forming a second path length control signal; and second path length adjusting means coupled to the secondary ring for adjusting the path length around the secondary ring and connected to said second summing means for being controlled by said second path length control signal.

10. A ring laser gyroscope comprising:

a primary active ring resonator;

a secondary passive ring resonator having a path length substantially less than that of the primary ring and external to the primary ring but optically coupled to the primary ring for enhancing a desired single longitudinal resonance mode of the primary ring;

photo-sensitive means coupled to the primary ring for forming an output signal indicative of the laser radiation propagating around the primary ring;

first and second feedback loops for controlling the path lengths around respective ones of the primary and secondary rings, said loops comprising respective path length adjusting devices coupled to respective ones of the primary and secondary rings, respective oscillators connected to respective ones of the path length adjusting devices and operable for forming respective low frequency dither signals for dithering the primary; and secondary ring path lengths at respective different frequencies, respective phase-sensitive detectors connected to said photo-sensitive means for sensing components of the output signal from the photo-sensitive means at respective ones of the dither signal frequencies, and respective combining means for combining the output signals from the respective phase-sensitive detectors with the dither signals applied to the respective path length adjusting devices, the response characteristic of the second feedback loop having a servo-time constant which is a plurality of times greater than that of the response characteristic of the first feedback loop.

* * * * *